US011034454B1

(12) United States Patent
Malecha et al.

(10) Patent No.: US 11,034,454 B1
(45) Date of Patent: Jun. 15, 2021

(54) SEAT SPREADER MOUNTED SEAT PRIVACY CLOSEOUT (71) Applicant: B/E Aerospace, Inc., Winston-Salem, NC (US)

(72) Inventors: Jeremy F. Malecha, Pfafftown, NC (US); Jason Owen, Wichita, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/675,520

(22) Filed: Nov. 6, 2019

(51) Int. Cl.
*B64D 11/06* (2006.01)

(52) U.S. Cl.
CPC ...... *B64D 11/0606* (2014.12); *B64D 11/0638* (2014.12); *B64D 11/0644* (2014.12)

(58) Field of Classification Search
CPC ............ B64D 11/0606; B64D 11/0636; B64D 11/0627; B64D 11/0602; B64D 11/0638; B64D 11/0023; B64D 11/0644; B60N 2/757
USPC .................................................. 297/188.04
See application file for complete search history.

(56) References Cited

U.S. PATENT DOCUMENTS

| 4,440,443 | A | 4/1984 | Nordskog |
| 6,644,736 | B2 | 11/2003 | Nguyen et al. |
| 6,742,842 | B2 | 6/2004 | Dowty |
| 7,568,759 | B2 | 8/2009 | Schurg |
| 9,216,665 | B2 * | 12/2015 | Herault ............ B64D 11/0641 |
| 9,340,291 | B2 | 5/2016 | Nestel et al. |
| 9,567,085 | B2 | 2/2017 | Suzuki et al. |
| 9,630,720 | B2 | 4/2017 | Saint-Jalmes |
| 9,834,308 | B2 | 12/2017 | Henshaw et al. |
| 10,384,579 | B1 | 8/2019 | Wanner et al. |
| 10,479,506 | B1 * | 11/2019 | Colletti .............. B64D 11/0606 |
| 10,494,101 | B2 * | 12/2019 | Wilson ................... B60N 2/809 |
| 2009/0134688 | A1 | 5/2009 | Waltman et al. |
| 2015/0274299 | A1 | 10/2015 | Henshaw et al. |

(Continued)

FOREIGN PATENT DOCUMENTS

DE 102004061471 9/2007
EP 1187739 A1 3/2002
(Continued)

OTHER PUBLICATIONS

U.S. Appl. No. 16/666,953, filed Oct. 29, 2019, Malecha et al.
Extended Search Report for European Application No. 20206320.2 dated Mar. 18, 2021, 7 pages.

*Primary Examiner* — Milton Nelson, Jr.
(74) *Attorney, Agent, or Firm* — Suiter Swantz pc llo (57) ABSTRACT

An aircraft passenger seat assembly is disclosed. In embodiments, the aircraft passenger seat assembly includes an aircraft passenger seat including a seatback configured to support an upper body of an aircraft passenger, and a seat frame including at least one seat spreader disposed on a lateral side of the seatback. In embodiments, the aircraft passenger seat assembly may further include at least one privacy assembly. The at least one privacy assembly may include a closeout body coupled to the at least one seat spreader, and a privacy panel coupled to the closeout body, the privacy panel extending from the closeout body in order to at least partially separate a seating environment of the aircraft passenger seat from an adjacent seating environment of an adjacent aircraft passenger seat.

21 Claims, 10 Drawing Sheets

(56) References Cited

U.S. PATENT DOCUMENTS

2016/0152169 A1* 6/2016 Zheng .................... B60R 11/00
                                                           297/163
2017/0015420 A1   1/2017 Henshaw et al.
2019/0100151 A1   4/2019 Tait

FOREIGN PATENT DOCUMENTS

EP            1584553 A2    10/2005
WO    WO-2020039236 A1 *    2/2020  ......... B64D 11/0606

* cited by examiner

SEAT SPREADER MOUNTED SEAT PRIVACY CLOSEOUT

BACKGROUND

In traditional aircraft settings, there is generally a lack of privacy between passengers in economy seating, both between passengers in adjacent seats within the same row, and between rows of seats. Added privacy and other amenities are usually not provided until a premium economy seating class. Additionally, traditional aircraft seating does not provide sufficient stowage opportunities for personal items, such as beverages, bags, headphones, and the like. Therefore, there exists a need in the art which address one or more of the shortfalls of previous approaches identified above.

SUMMARY

An aircraft passenger seat assembly is disclosed. In embodiments, the aircraft passenger seat assembly includes an aircraft passenger seat including a seatback configured to support an upper body of an aircraft passenger, and a seat frame including at least one seat spreader disposed on a lateral side of the seatback. In embodiments, the aircraft passenger seat assembly may further include at least one privacy assembly. The at least one privacy assembly may include a closeout body coupled to the at least one seat spreader, and a privacy panel coupled to the closeout body, the privacy panel extending from the closeout body in order to at least partially separate a seating environment of the aircraft passenger seat from an adjacent seating environment of an adjacent aircraft passenger seat.

In some embodiments of the aircraft passenger seat assembly, the closeout body is configured to substantially fill a gap between a lateral surface of the seatback of the aircraft passenger seat and an adjacent lateral surface of the adjacent aircraft passenger seat.

In some embodiments of the aircraft passenger seat assembly, the closeout body includes a first contoured edge conforming to the lateral surface of the aircraft passenger seat, and a second contoured edge conforming to the adjacent lateral surface of the adjacent aircraft passenger seat.

In some embodiments of the aircraft passenger seat assembly, the aircraft passenger seat further includes at least one armrest coupled to the at least one seat spreader.

In some embodiments of the aircraft passenger seat assembly, the at least one armrest is pivotably coupled to the at least one spreader.

In some embodiments of the aircraft passenger seat assembly, the at least one privacy assembly further includes a recess configured to receive the at least one armrest when the armrest is actuated into a stowed position.

In some embodiments of the aircraft passenger seat assembly, the closeout body is coupled to the at least one seat spreader by one or more mechanical fasteners.

In some embodiments of the aircraft passenger seat assembly, the closeout body and the at least one seat spreader is fabricated as a unitary seat spreader assembly.

In some embodiments of the aircraft passenger seat assembly, the at least one seat spreader includes a first seat spreader disposed on a first lateral side of the seatback, and a second seat spreader disposed on a second lateral side of the seatback opposite the first side.

In some embodiments of the aircraft passenger seat assembly, the at least one privacy assembly includes a first privacy assembly coupled to the first seat spreader, and a second privacy assembly coupled to the second seat spreader.

In some embodiments of the aircraft passenger seat assembly, the closeout body includes a rear closeout body surface proximate to a rear seatback surface of the seatback.

In some embodiments of the aircraft passenger seat assembly, the rear closeout body surface includes one or more cupholder assemblies disposed on the rear closeout body surface.

In some embodiments of the aircraft passenger seat assembly, the rear closeout body surface includes one or more storage structures comprising at least one of a hook, a clip, a bracket, or a mobile device stowage assembly.

In some embodiments of the aircraft passenger seat assembly, the privacy panel is removably coupled to the closeout body.

An aircraft passenger seat privacy assembly is disclosed. In embodiments, the aircraft passenger seat privacy assembly includes a closeout body coupled to at least one seat spreader of an aircraft passenger seat, wherein the closeout body is configured to at least partially fill a gap between a lateral surface of the aircraft passenger seat and an adjacent lateral surface of an adjacent passenger seat. In additional embodiments, the aircraft passenger seat privacy assembly includes a privacy panel coupled to the closeout body, the privacy panel extending from the closeout body proximate to a front seatback surface of the aircraft passenger seat in order to at least partially separate a seating environment of the aircraft passenger seat from an adjacent seating environment of the adjacent aircraft passenger seat.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

In traditional aircraft settings, there is generally a lack of privacy between passengers in economy seating, both between passengers in adjacent seats within the same row, and between rows of seats. Added privacy and other amenities are usually not provided until a premium economy seating class. Additionally, traditional aircraft seating does not provide sufficient stowage opportunities for personal items, such as beverages, bags, headphones, and the like.

Accordingly, embodiments of the present disclosure are directed to an aircraft passenger seat assembly which cure one or more of the shortfalls of previous approaches identified above. Embodiments of the present disclosure are directed to a privacy assembly for an aircraft passenger seat assembly, the privacy assembly including a closeout body and a privacy panel. Privacy panels of the present disclosure may provide separation between adjacent aircraft seats and aircraft passengers. Additional embodiments of the present disclosure are directed to a closeout body of a privacy assembly configured to fill gaps/spaces between adjacent aircraft seats. Further embodiments of the present disclosure are directed to cupholder assemblies and other storage structures disposed on and/or within the closeout bodies.

It is contemplated herein that the aircraft passenger seat assembly may provide improved privacy between passengers seated in adjacent aircraft passenger seats. It is further contemplated herein that the aircraft passenger seat assembly may provide improved privacy between passengers seated in different rows. Improved privacy may be particularly beneficial in the context of regular economy seats. It is further contemplated herein that privacy assemblies including closeout bodies may enable additional storage structures for personal items, such as cups, beverages, bags, headphones, and the like.

Reference will now be made in detail to the subject matter disclosed, which is illustrated in the accompanying drawings.

Figure 1A:
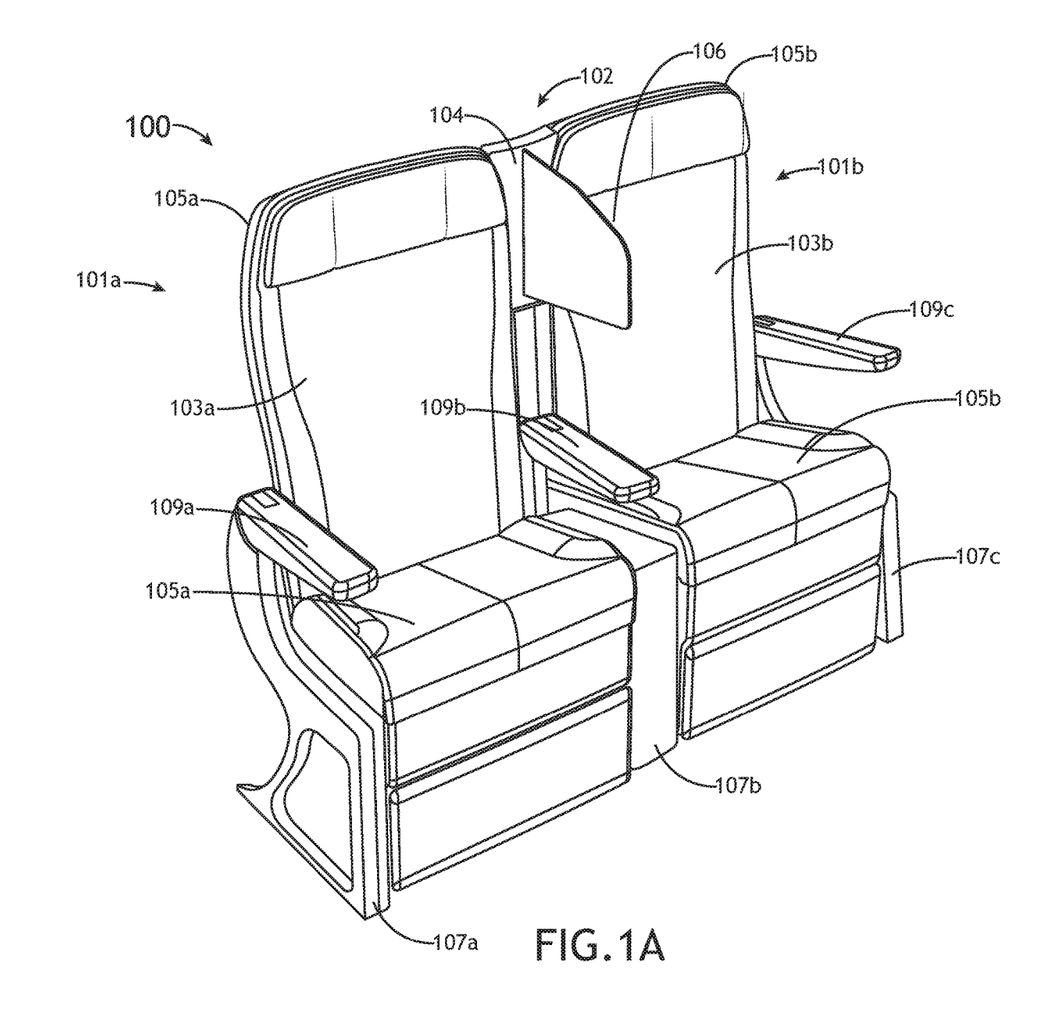
FIG. 1A illustrates a front perspective view of an aircraft passenger seat assembly, in accordance with one or more embodiments of the present disclosure.

FIG. 1A illustrates a front perspective view of an aircraft passenger seat assembly 100, in accordance with one or more embodiments of the present disclosure. The aircraft passenger seat assembly 100 may include, but is not limited to, an aircraft passenger seat 101a, 101b and a privacy assembly 102. The privacy assembly 102 may include, but is not limited to, a closeout body 104 and a privacy panel 106.

In many aircraft settings, aircraft passenger seats 101a, 101b are arranged in rows, as shown in FIG. 1A. For example, a first aircraft passenger seat 101a may be positioned adjacent to a second aircraft passenger seat 101b. Additional rows of aircraft passenger seats 101a, 101b may be positioned in front of and/or behind the row of aircraft passenger seats 101a, 101b pictured in FIG. 1A. In embodiments, an aircraft passenger seat 101a, 101b may include a seatback 103a, 103b configured to support an upper body of an aircraft passenger, and a seat structure 105a, 105b upon which the passenger may be seated. The seatbacks 103a, 103b may be pivotably coupled to the seat structures 105a, 105b such that the seatbacks 103a, 103b may each be individually and selectively actuated (e.g., selectively pivoted, selectively reclined) between an upright position (shown in FIG. 1A) and one or more reclined positions.

In embodiments, an aircraft passenger seat 101a, 101b may include a seat frame including one or more seat spreaders 107a, 107b. For example, as shown in FIG. 1A, the first aircraft passenger seat 101a may include a first seat spreader 107a disposed on a first lateral side of the aircraft passenger seat 101a, and a second seat spreader 107b disposed on a second lateral side of the aircraft passenger seat 101a opposite the first lateral side. By way of another example, the second aircraft passenger seat 101b may include a first seat spreader 107b disposed on a first lateral side of the aircraft passenger seat 101b, and a second seat spreader 107c disposed on a second lateral side of the aircraft passenger seat 101a opposite the first lateral side.

The one or more seat spreaders 107a, 107b, 107c may be coupled to the seat structure 105a, 105b and/or the seatback 103a, 103b of the aircraft passenger seats 101a, 101b. The one or more seat spreaders 107a, 107b, 107c may define a spacing between adjacent aircraft passenger seats 101a, 101b, such that a width of a gap 115 between the first aircraft passenger seat 101a and the second aircraft passenger seat 101b is equivalent, or substantially equivalent, to the width of the respective seat spreader 107a, 107b, 107c.

In embodiments, each aircraft passenger seat 101a, 101b may include one or more armrests 109a, 109b, 109c, 109d disposed on lateral sides of each aircraft passenger seat 101a, 101b. The armrests 111a, 111b may be configured to separate adjacent aircraft seats 101a, 101b, as well as separate aircraft seats 101a, 101b from an aisle or an outer wall of the aircraft. For example, the first aircraft passenger seat 101a may include a first armrest 109a disposed on a first lateral side of the aircraft passenger seat 101a, and a second armrest 109b disposed on a second lateral side of the aircraft passenger seat 101a opposite the first lateral side. By way of another example, the second aircraft passenger seat 101b may include a first armrest 109b disposed on a first lateral side of the aircraft passenger seat 101b, and a second armrest 109c disposed on a second lateral side of the aircraft passenger seat 101b opposite the first lateral side. In this regard, adjacent aircraft passenger seats 101a, 101b may share an armrest 109 (e.g., armrest 109b) disposed between the respective aircraft passenger seats 101a, 101b. However, in additional and/or alternative embodiments, each aircraft passenger seat 101a, 101b may each include two designated armrests 109 disposed on each lateral side of the aircraft passenger seat 101a, 101b such that each passenger has their own pair of designated armrests 109.

In embodiments, the armrests 109a-109c may be coupled to the seat spreaders 107a-107c. For example, the armrest 109a may be coupled to the seat spreader 107a, the armrest 109b may be coupled to the seat spreader 107b, and the armrest 109c may be coupled to the seat spreader 107c. In some embodiments, the armrests 109a-109c may be pivotably coupled to the seat spreaders 107a-107c. In this regard, the armrests 109a-109c may be configured to be selectively actuated (e.g., pivoted, rotated) from one or more "deployed" positions, as shown in FIG. 1A, to a "stowed" position. For example, the armrest 109b shown in FIG. 1A may be selectively actuated from the shown deployed position to a stowed position in which the armrest 109b is actuated up into the gap 115 between the aircraft passenger seats 101a, 101b.

For the purposes of the present disclosure, the term "stowed position" may be used to refer to a configuration/orientation of an armrest 109 which has been actuated such that it is parallel, or substantially parallel, to a seatback 103. Conversely, the term "deployed position" may be used to refer to a configuration/orientation of an armrest 109 which is not parallel, or substantially parallel, to a seatback 103 such that it may support the arms/elbows of a passenger. For example, as shown in FIG. 1A, the armrests 109a-109c may be selectively actuated to a deployed position in which the armrests 109a-109c are parallel, or substantially parallel, to the seat structure 105a-105c.

As noted previously herein with respect to the armrests 109a-109c, adjacent aircraft passenger seats 101a, 101b may share a seat spreader 107, or may each include their own designated seat spreaders 107. For example, as shown in FIG. 1A, the seat spreader 107b and the armrest 109b coupled to the seat spreader 107b may be disposed between lateral sides of the first aircraft passenger seat 101a and the second aircraft passenger seat 101b such that the first aircraft passenger seat 101a and the second aircraft passenger seat 101b share (e.g., each include) the seat spreader 107b and the armrest 109b. By way of another example, each aircraft passenger seat 101a, 101b may include designated seat spreaders 107 and designated armrests 109.

Generally speaking, each aircraft passenger seat 101a, 101b may include a "seating environment" within which a passenger is seated, wherein the seating environment is approximately defined by the seatback 103a, 103b, seat structure 105a, 105b, and the armrests 109a-109c. In embodiments, the seatback 103a, 103b of an aircraft passenger seat 101a, 101b may include a front seatback surface to support an upper body of a passenger, and a rear seatback surface which faces towards a passenger seated directly behind each respective aircraft passenger seat 101a, 101b. As will be noted in further detail herein, the rear seatback surface may include a seatback bezel, a display monitor (e.g., TV), a tray table, and the like.

In embodiments, the aircraft passenger seat assembly 100 may further include one or more privacy assemblies 102 coupled to at least one aircraft passenger seat 101. For example, as shown in FIG. 1A, the aircraft passenger seat assembly 100 may include a privacy assembly 102 coupled to the first aircraft passenger seat 101a and/or the second aircraft passenger seat 101b. In embodiments, a privacy assembly 102 may be coupled to a seat spreader 107 of the aircraft passenger seat 101a, 101b. For example, as shown in FIG. 1A, the privacy assembly 102 may be coupled to the seat spreader 107b disposed between the first aircraft passenger seat 101a and the second aircraft passenger seat 101b. In embodiments, the privacy assembly 102 includes a closeout body 104 and one or more privacy panels 106. The closeout body 104 may be coupled to the seat spreader 107 of an aircraft passenger seat 101 in order to at least partially fill a gap 115a between aircraft passenger seats 101.

Figure 1B:
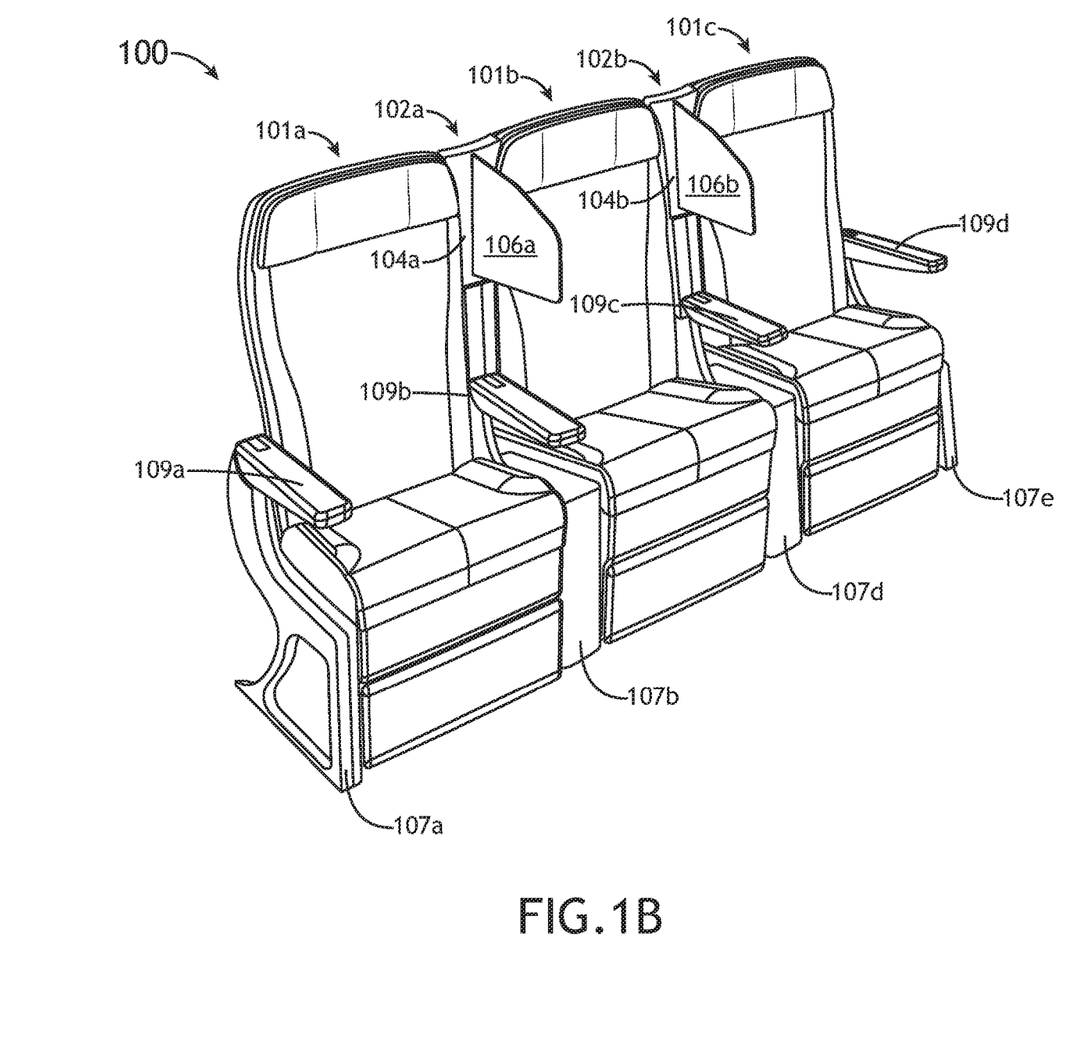
FIG. 1B illustrates a front perspective view of an aircraft passenger seat assembly, in accordance with one or more embodiments of the present disclosure.

For example, as shown in FIG. 1B, a row of seats in an aircraft may include a first aircraft passenger seat 101a, a second aircraft passenger seat 101b, and a third aircraft passenger seat 101c. In this example, the row of aircraft passenger seats 101a-101c may include a first privacy assembly 102a disposed between the first aircraft passenger seat 101a and the second aircraft passenger seat 101b, and a second privacy assembly 102b disposed between the second aircraft passenger seat 101b and the third aircraft passenger seat 101c. For example, the first privacy assembly 102a may be coupled to a seat spreader 107b disposed between the first aircraft passenger seat 101a and the second aircraft passenger seat 101b, and the second privacy assembly 102b may be coupled to a seat spreader 107c disposed between the second aircraft passenger seat 101b and the third aircraft passenger seat 101c.

The privacy assemblies 102a-102n may be fabricated with any material known in the art including, but not limited to, plastic materials, metals, and the like. In this reagard, the privacy assemblies 102a-102n may be fabricated via any fabrication processes known in the art including, but not limited to, thermoforming processes, injection molding processes, three-dimensional (3D) printing processes, casting processes, machining processes, shearing processes, welding processes, and the like.

In embodiments, as shown in FIGS. 1A-1B, the closeout body 104 of the respective privacy assembly 102 may be configured to at least partially fill a gap 115 between the lateral surfaces of adjacent seatbacks 103a, 103b. For example, as shown in FIG. 1A, the closeout body 104 may be configured to substantially fill a gap 115 between a lateral surface of the seatback 103a and a lateral surface of the seatback 103b. By filling, or substantially filling, gaps 115 between lateral surfaces of adjacent aircraft passenger seats 101a, 101b, the privacy assembly 102 of the present disclosure may provide improved privacy between rows of aircraft passenger seats 101a, 101b. In particular, the by substantially filling gaps 115 between lateral surfaces of adjacent aircraft passenger seats 101a, 101b, the closeout body 104 of the privacy assembly 102 may prevent passengers from viewing passengers and/or seating environments in other rows between the gaps 115. Furthermore, the closeout body 104 may prevent passengers from placing personal items and/or limbs (e.g., legs, feet) within the gaps 115, thereby preventing passengers from infringing on the privacy of other passengers.

In embodiments, the one or more privacy panels 106 of the privacy assembly 102 are configured to extend from the closeout body 104 in order to at least partially separate seating environments of adjacent aircraft passenger seats 101a, 101b. For example, as shown in FIG. 1A, the privacy panel 106 may extend from the closeout body 104 proximate to the front seatback surfaces of the first seatback 103a and the second seatback 103b. In this example, the privacy panel 106 partially separates the first seating environment of the first aircraft passenger seat 101a and the second seating environment of the second aircraft passenger seat 101b. By separating adjacent seating environments, the privacy assembly 102 of the present disclosure may provide improved privacy for aircraft passengers seated adjacent to one another. Additionally, it is contemplated herein that the one or more privacy panels 106 may provide additional surfaces for aircraft passengers to rest their head, neck, and shoulders, thereby enhancing passenger comfort and overall flying experience.

The privacy assembly 102 is further shown and described in U.S. patent application Ser. No. 16/666,953 entitled BEZEL-MOUNTED SEAT PRIVACY CLOSEOUT filed on Oct. 29, 2019, naming Jeremy Malecha and Jason Owen as inventors, which is incorporated herein by reference in the entirety.

Figure 2A:
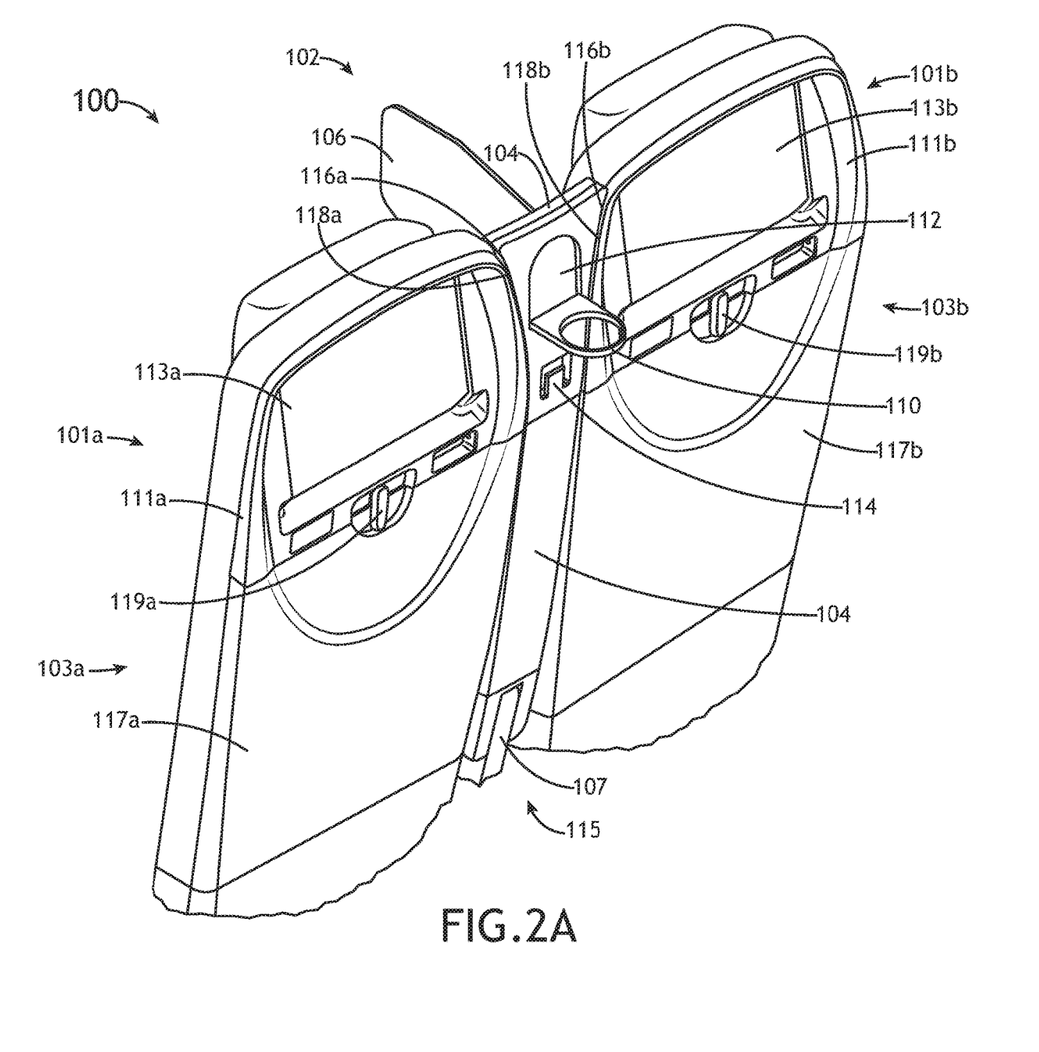
FIG. 2A illustrates a rear perspective view of an aircraft passenger seat assembly, in accordance with one or more embodiments of the present disclosure.
Figure 2B:
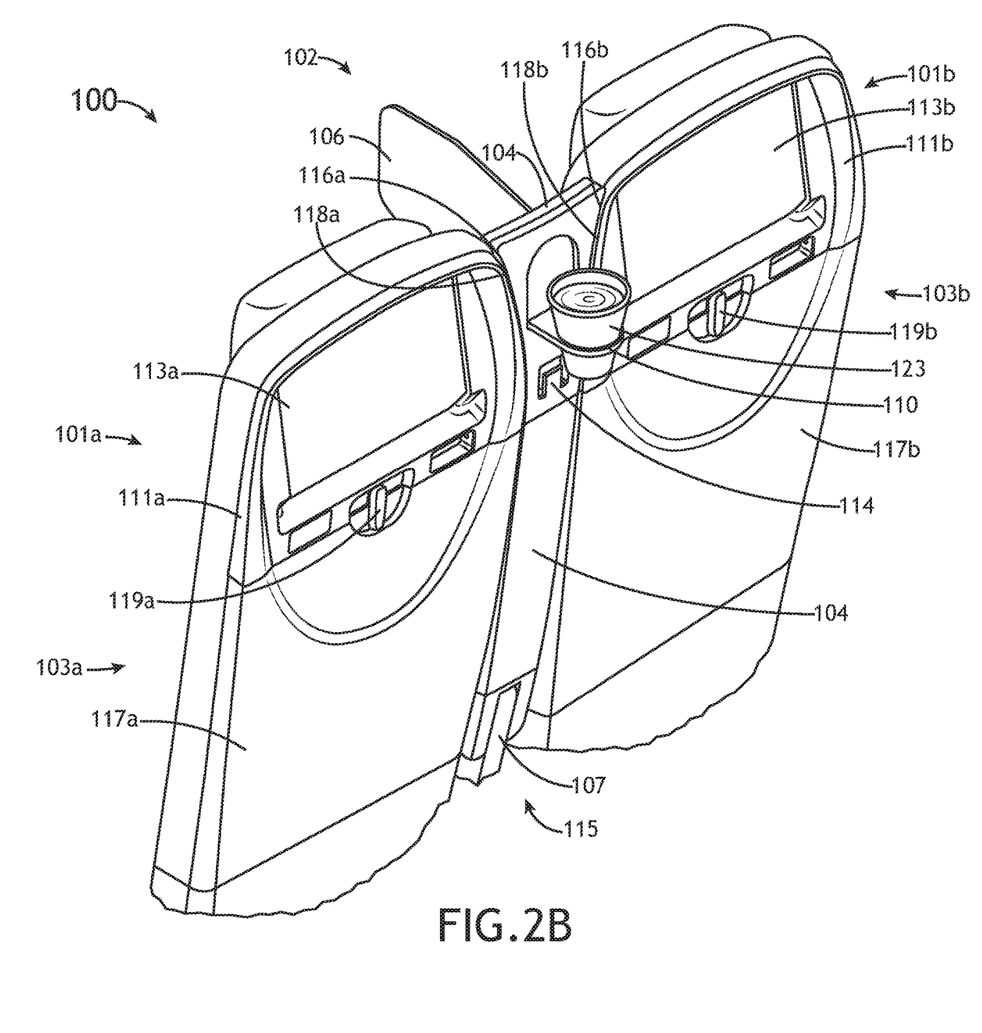
FIG. 2B illustrates a rear perspective view of an aircraft passenger seat assembly, in accordance with one or more embodiments of the present disclosure.

FIG. 2A illustrates a rear perspective view of an aircraft passenger seat assembly 100, in accordance with one or more embodiments of the present disclosure. FIG. 2B illustrates a rear perspective view of an aircraft passenger seat assembly 100, in accordance with one or more embodiments of the present disclosure.

As shown in FIG. 2A, a rear seatback surface of the seatback 103a, 103b may include, but is not limited to, a seatback bezel 111a, 111b, a display monitor 113a, 113b, and a tray table 117a, 117b. In embodiments with a display monitor 113a, 113b, the seatback bezel 111a, 111b may include a display monitor bezel 111a, 111b configured to at least partially surround the display monitor 113a, 113b. The seatback bezel 111a, 111b may include a tray table locking assembly 119a, 119b disposed within the seatback bezel 111a, 111b, wherein the tray table locking assembly 119a, 119b is configured to be actuated in order to lock the tray table 117a, 117b in a "closed" or "stowed" position, and release the tray table 117a, 117b into an "open" or "deployed" position.

The closeout body 104 and/or privacy panel 106 of the privacy assembly 102 may be fabricated via any fabrication techniques known in the art including, but not limited to, thermoforming processes, injection molding processes, and the like. Similarly, components of the privacy assembly 102 may be fabricated from any material known in the art including, but not limited to, plastic materials, metal materials, and the like. In embodiments, the closeout body 104 of the privacy assembly 102 may be coupled to the seat spreader 107 using any techniques known in the art. For example, the closeout body 104 may be coupled to the seat spreader 107 by one or more mechanical fasteners including, but not limited to, rivets, bolts, welding, and the like. By way of another example, the closeout body 104 may be coupled to the seat spreader 107 via one or more adhesives.

In embodiments, the closeout body 104 may include a rear closeout body surface proximate to the rear seatback surface of the seatback 103a, 103b. In some embodiments, the rear closeout body surface of the closeout body 104 may include one or more structures configured to hold/store personal items of aircraft passengers. For example, as shown in FIGS. 2A-2B, the rear closeout body surface may include one or more cupholder assemblies 108 disposed on and/or within the rear closeout body surface. The one or more cupholder assemblies 108 may be configured to hold/store a cup 123 or another beverage container.

In some embodiments, the cupholder assembly 108 may include an actuatable cupholder assembly 108. In this regard, the cupholder assembly 108 may be configured to be actuated between an "inactive" or "stowed" position and an "active" position, as shown in FIGS. 2A-2B. For example, the cupholder assembly 108 may include a support structure 110 configured to support/receive a cup 123, wherein the support structure 110 is pivotably coupled to the rear closeout body surface of the closeout body 104. The support structure 110 may be pivotably coupled to the rear closeout body surface using any technique known in the art including, but not limited to, one or more hinges, a pivotable tab/detent assembly, and the like. In some embodiments, the support structure 110 may be disposed within one or more recesses 112 within the rear closeout body surface when in the "stowed" or "inactive" position.

In embodiments, the rear closeout body surface of the closeout body 104 may further include one or more storage structures 114. For example, as shown in FIGS. 2A-2B, the rear closeout body surface may include a storage structure 114 configured to store, hold, or otherwise receive personal items of an aircraft passenger. The one or more storage structures 114 may include any storage structures known in the art including, but not limited to, a hook, a clip, a bracket, a mobile device stowage assembly (e.g., phone holder, phone docking station), and the like. For instance, as shown in FIG. 2A, the storage structure 114 may include a "U" bracket configured to store/hold items such as personal bags (e.g., purses, backpacks), trash bags, headphones, and the like.

In embodiments, gaps 115 between adjacent seatbacks 103a, 103b may be at least partially defined by lateral surfaces 118a, 118b of the adjacent seatbacks 103a, 103b. In embodiments, the closeout body 104 may be shaped to conform or substantially conform to the lateral side(s) of one or more aircraft passenger seats 101a, 101b. In this regard, the closeout body 104 may be configured to fill, or substantially fill, a gap 115 formed between adjacent aircraft passenger seats 101a, 101b. For example, in some embodiments, as shown in FIG. 2A, the closeout body 104 may include a first contoured edge 116a conforming to a lateral surface 118a of the seatback 103a of the first aircraft passenger seat 101a. Similarly, the closeout body 104 may include a second contoured edge 116b conforming to an adjacent lateral surface 118b of an adjacent seatback 103b of an adjacent aircraft passenger seat 101b. With contoured edges 116a, 116b configured to conform, or substantially conform, to lateral surfaces 118a, 118b of the seatbacks 103a, 103b, the closeout body may be configured to fill, or substantially fill, gaps 115 between adjacent seatbacks 103a, 103b.

As noted previously herein, the seatbacks 103a, 103b may be pivotably coupled to the seat structures 105a, 105b such that the seatbacks 103a, 103b may each be individually and selectively actuated (e.g., selectively pivoted, selectively reclined) between an upright position (shown in FIG. 1A) and one or more reclined positions. In some embodiments, the seat spreaders 107a-107n and the armrests 109a-109b may be coupled to the seat structures 105a-105n such that the seat spreaders 107a-107n and the armrests 109a-109b are not actuated in conjunction with the seatbacks 103a-103n. In this regard, in some embodiments, the seat spreaders 107a-107n may be stationary with respect to the seat structures 105a-105n such that they are not moved/actuated when the seatbacks 103a-103n are actuated into a reclined position. Accordingly, it is noted herein that coupling each of the first privacy assembly 102a and the second privacy assembly 102b to the seat spreader 107b and the seat spreader 107c may enable the respective privacy assemblies 102a, 102b to remain stationary when any of the aircraft passenger seats 101a-101c are reclined into a reclined position. This may be further understood with reference to FIG. 2C.

Figure 2C:
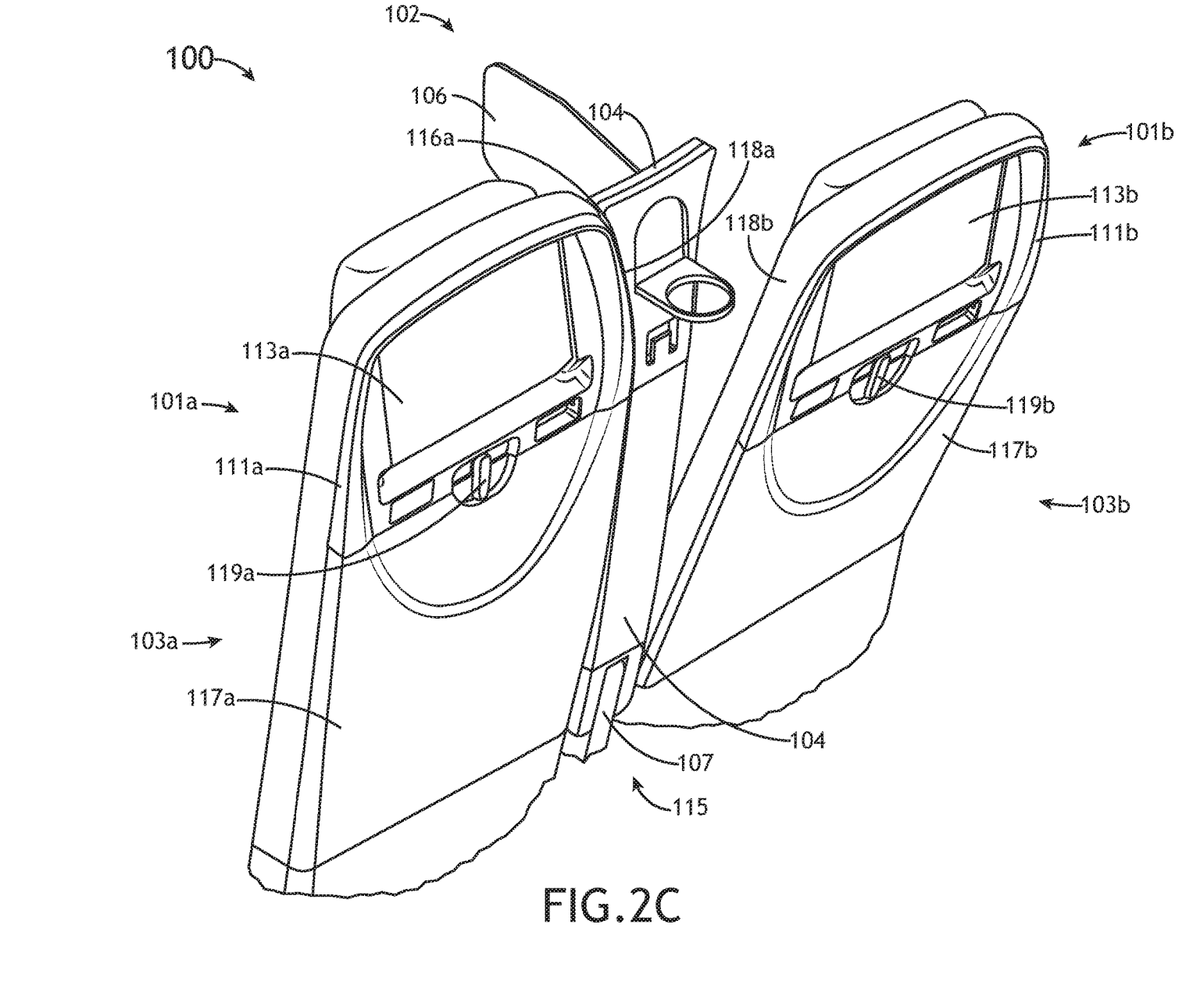
FIG. 2C illustrates a rear perspective view of an aircraft passenger seat assembly, in accordance with one or more embodiments of the present disclosure.

FIG. 2C illustrates a rear perspective view of an aircraft passenger seat assembly 100, in accordance with one or more embodiments of the present disclosure.

As shown in FIG. 2C, a privacy assembly 102 may be coupled to a seat spreader 107 disposed between a first aircraft passenger seat 101a and an adjacent second aircraft passenger seat 101b. The seat spreader 107 may be coupled to the seat structures 105a, 105b of each respective aircraft passenger seat 101a, 101b such that the seat spreader 107 is stationary with respect to the seatbacks 103a, 103b. Additionally, the closeout body 104 of the privacy assembly 102 may be coupled to the seat spreader 107 via one or more mechanical fasteners (e.g., bolts, rivets) such that the closeout body 104 and the privacy assembly 102 are stationary with respect to the seat structures 105a, 105b. Therefore, the closeout body 104 and privacy assembly 102 may remain stationary when the first aircraft passenger seat 101a and/or the second aircraft passenger seat 101b are selectively actuated (e.g., reclined forwards or backwards).

For example, the seatback 103b of the second aircraft passenger seat 101b may be selectively actuated into a reclined position, as shown in FIG. 2C. Due to the fact that the privacy assembly 102 is coupled to the seat spreader 107, the privacy assembly 102 may remain stationary. It is noted herein that the privacy assembly 102 may also remain stationary in the event the first aircraft passenger seat 101a is reclined to a reclined position, and/or if both aircraft passenger seats 101a, 101b are reclined to a reclined position.

Figure 3A:
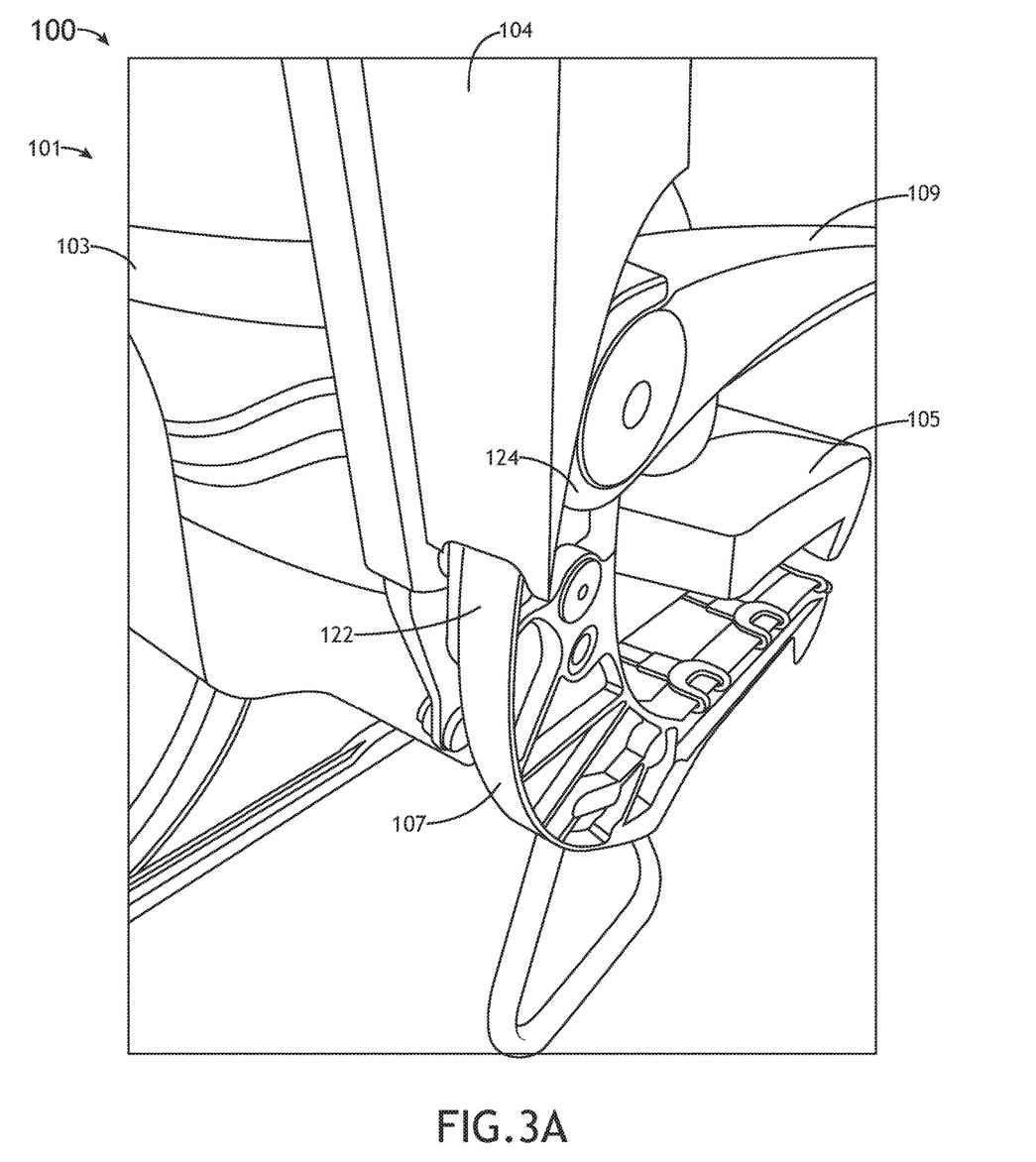
FIG. 3A illustrates a perspective view of a closeout body of a privacy assembly coupled to a seat spreader of an aircraft passenger seat, in accordance with one or more embodiments of the present disclosure.
Figure 3B:
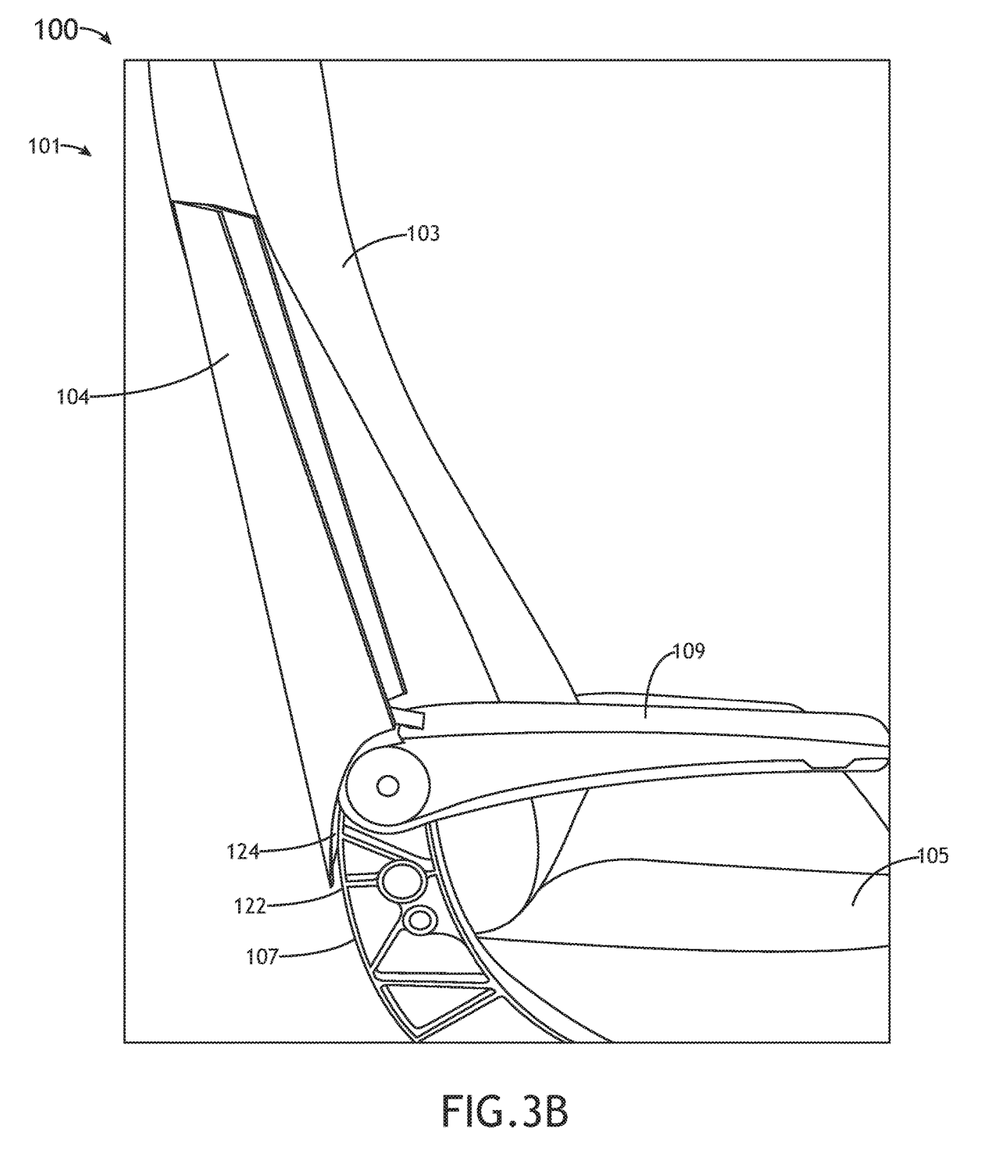
FIG. 3B illustrates a side elevation view of a closeout body of a privacy assembly coupled to a seat spreader of an aircraft passenger seat, in accordance with one or more embodiments of the present disclosure.

FIG. 3A illustrates a perspective view of a closeout body 104 of a privacy assembly 102 coupled to a seat spreader 107 of an aircraft passenger seat 101, in accordance with one or more embodiments of the present disclosure. FIG. 3B illustrates a side elevation view of a closeout body 104 of a privacy assembly 102 coupled to a seat spreader 107 of an aircraft passenger seat 101, in accordance with one or more embodiments of the present disclosure.

In embodiments, the closeout body 104 of the privacy assembly 102 may be coupled to the seat spreader 107. The closeout body 104 may be configured to be coupled to a top surface, lateral surface, rear surface, and/or a lower surface of the seat spreader 107. For example, as shown in FIG. 3, the seat spreader 107 may include one or more engagement surfaces 122. For instance, as shown in FIGS. 3A and 3B, the seat spreader 107 may include an engagement surface 122 defining at least a portion of a top and rear surface of the seat spreader 107. In this example, the closeout body 104 may further include an engagement surface 124 which is configured to be coupled to and/or conform to at least a portion of the engagement surface 122 of the seat spreader 107. In this regard, the closeout body 104 may be coupled to the seat spreader 107 via engagement and/or coupling of the engagement surfaces 122, 124. As noted previously herein, the closeout body 104 may be coupled to the seat spreader 107 via any means known in the art including, but not limited to, rivets, bolts, adhesives, welding, and the like.

In additional and/or alternative embodiments, the seat spreader 107 and the closeout body 104 may be fabricated by one or more fabrication processes such that the seat spreader 107 and the closeout body 104 constitute a single unitary seat spreader assembly (e.g., single unitary seat spreader/closeout body assembly). For example, the seat spreader 107 and the closeout body 104 may be fabricated as a unitary seat spreader assembly via any fabrication processes known in the art including, but not limited to, thermoforming processes, injection molding processes, three-dimensional (3D) printing processes, casting processes, machining processes, shearing processes, welding processes, and the like. It is noted herein that fabricating the seat spreader 107 and the privacy assembly 102 (e.g., closeout body 104) as a single unitary seat spreader assembly (e.g., single unitary seat spreader/closeout body assembly) may provide additional structural rigidity and strength, as well as reduce the weight of the aircraft passenger seat assembly 100.

As will be discussed in further detail herein, the closeout body 104 may be coupled to the seat spreader 107 in such a manner as to not interfere with the actuation of an armrest 109 pivotably coupled to the seat spreader 107. For example, in some embodiments, the closeout body 104 may be coupled to the seat spreader 107 along one or more surfaces which are rearward (e.g., towards the rear seatback surface) from the location in which the armrest 109 is pivotably coupled to the seat spreader 107. It is noted herein that mechanically coupling the closeout body 104 of the privacy assembly 102 directly to the seat spreader 107 may provide added structural support, rigidity, and durability to the privacy assembly 102.

Figure 4:
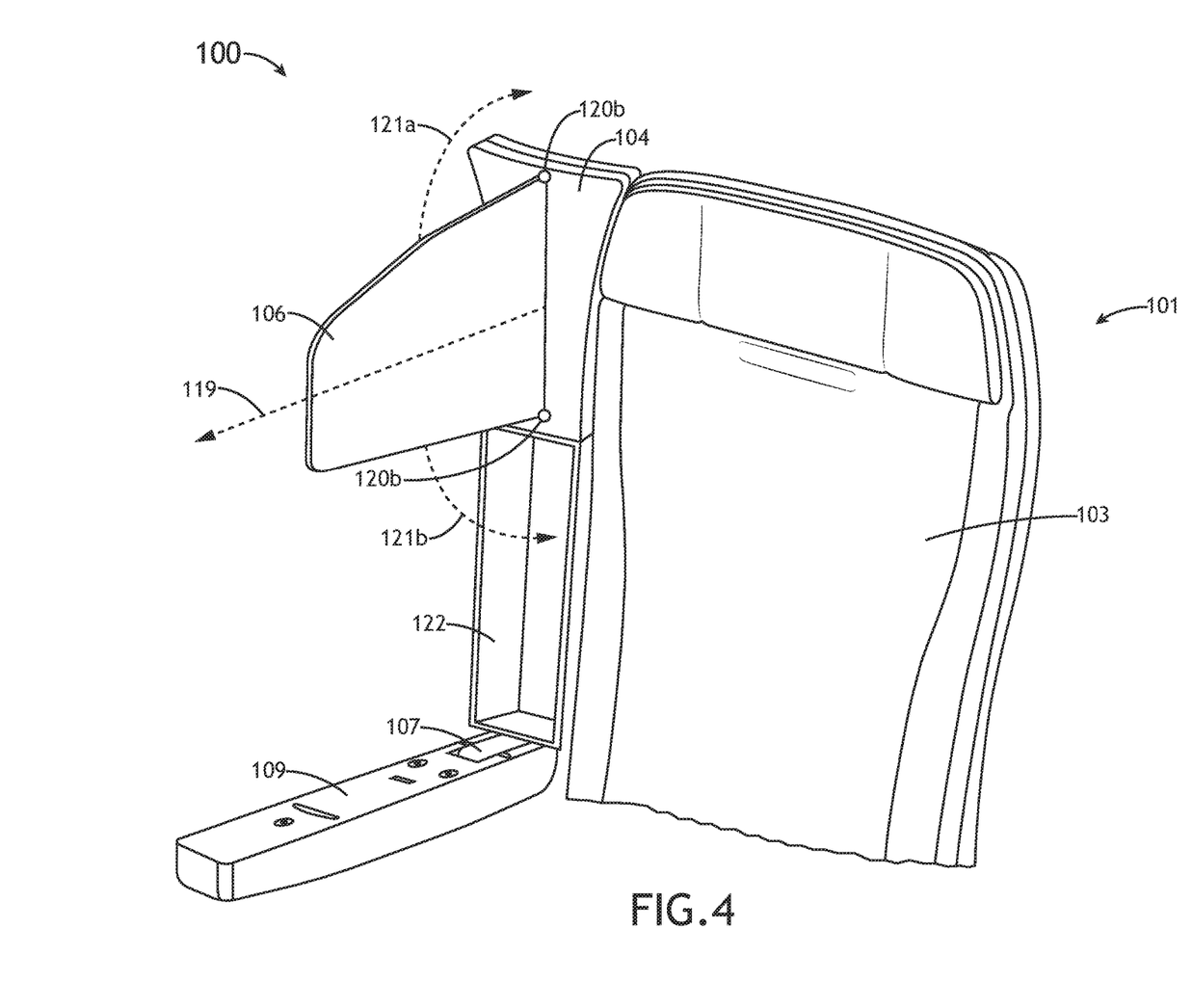
FIG. 4 illustrates a front perspective view of an aircraft passenger seat assembly, in accordance with one or more embodiments of the present disclosure.

FIG. 4 illustrates a front perspective view of an aircraft passenger seat assembly, in accordance with one or more embodiments of the present disclosure.

As noted previously herein, the one or more privacy panels 106 may be coupled to the closeout body 104 such that the one or more privacy panels 106 extend from the closeout body 104 proximate to the front seatback surface of the seatback 103. In this regard, the privacy panel 106 may be configured to at least partially separate a seating environment of an aircraft passenger seat 101a from an adjacent seating environment of an adjacent second aircraft passenger seat 101b.

It is noted herein that all passengers (e.g., a husband and wife) may not desire to have physical separation between adjacent seating environments. In order to account for differing privacy preferences between passengers, the privacy panel 106 may be removable in some embodiments. Accordingly, in some embodiments, the privacy panel 106 may be removably coupled to the closeout body 104. The privacy panel 106 may be removably coupled to the closeout body 104 via any coupling mechanism or assembly known in the art including, but not limited to, a tongue-and-groove interlocking assembly, a tab-and-slot interlocking assembly, and the like. For instance, the privacy panel 106 may include one or more projections (e.g., tongues, tabs) which are configured to be inserted within one or more recesses (e.g., grooves, slots) of the closeout body 104 in order to couple the privacy panel 106 to the closeout body 104.

In embodiments, the privacy panel 106 may be movable in order to provide improved privacy options and flexibility for passengers. For example, in some embodiments, the privacy panel 106 may include a retractable privacy panel 106, wherein the privacy panel 106 is configured to extend and retract along at least one movement axis. For instance, the privacy panel 106 may include one or more segments which are slidingly coupled to one another such that the privacy panel may extend and retract along a movement axis 119, as shown in FIG. 4. By way of another example, the privacy panel 106 may include an accordion-style privacy panel configured to fold along one or more creases in order to enable the privacy panel 106 to extend and retract along a movement axis 119. In embodiments, the retractable privacy panel 106 may be configured to retract from an active state to an inactive state, and extend from an inactive state to an active state.

By way of another example, the privacy panel 106 may be pivotably coupled to the closeout body 104 such that the privacy panel 106 may be pivoted or rotated according to a passenger's privacy preferences. The privacy panel 106 may be pivotably coupled to the closeout body 104 using any techniques or structured known in the art including, but not limited to, hinges. For instance, as shown in FIG. 3, the privacy panel 106 may be pivotably coupled to the closeout body 104 at hinge 120a, wherein the privacy panel 106 may be rotated/actuated about the hinge 120a along a clockwise rotation arc 121a. By way of another example, the privacy panel 106 may be pivotably coupled to the closeout body 104 at hinge 120b, wherein the privacy panel 106 may be rotated/actuated about the hinge 120b along a counterclockwise rotation arc 121b.

Figure 5A:
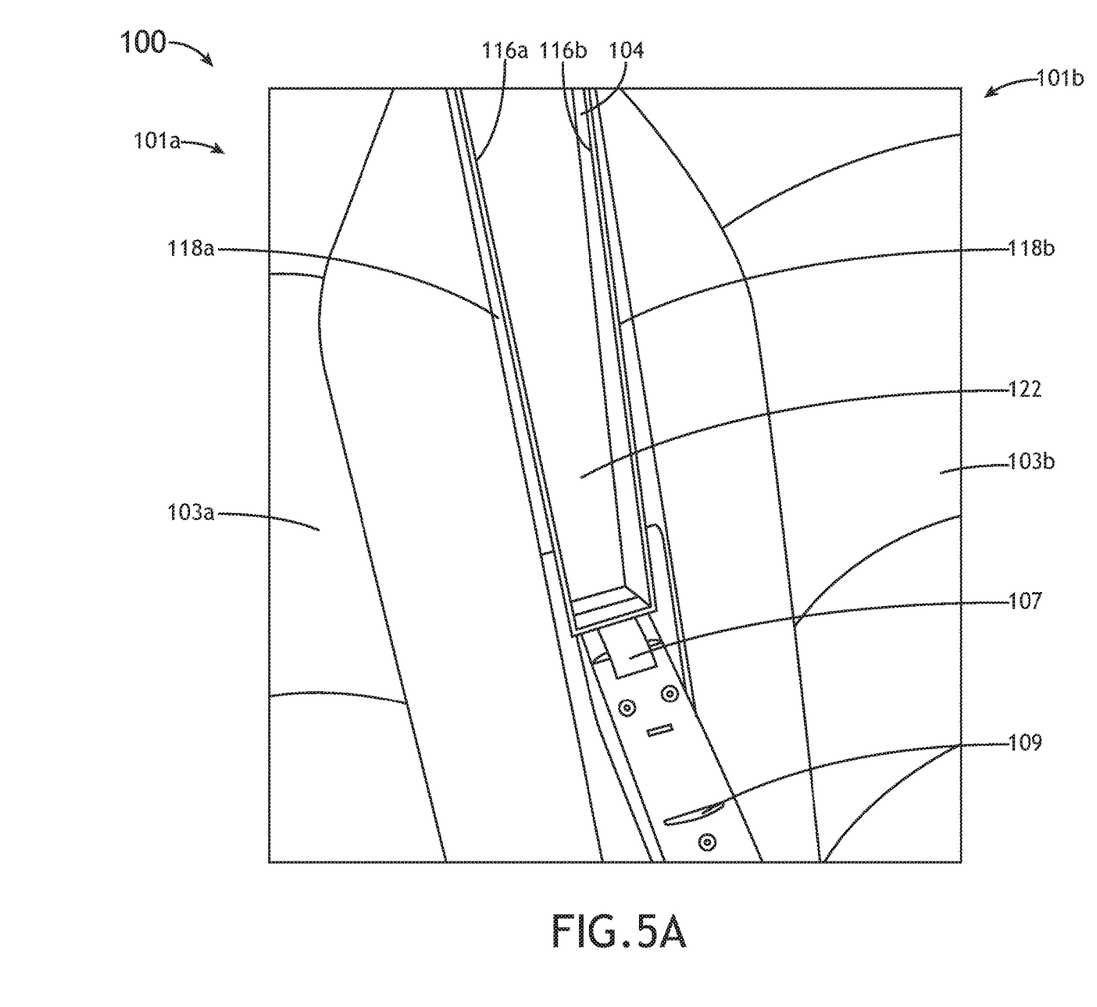
FIG. 5A illustrates a front perspective view of a closeout body of a privacy assembly, in accordance with one or more embodiments of the present disclosure.

FIG. 5A illustrates a front perspective view of a closeout body 104 of a privacy assembly 102, in accordance with one or more embodiments of the present disclosure. In particular, FIG. 5A illustrates a closeout body 104 and an armrest 109 coupled to a seat spreader 107 between adjacent aircraft passenger seats 101a, 101b, wherein the armrest 109 is in an "active" position (e.g., parallel, or substantially parallel, to the seat structure 105a, 105b).

Figure 5B:
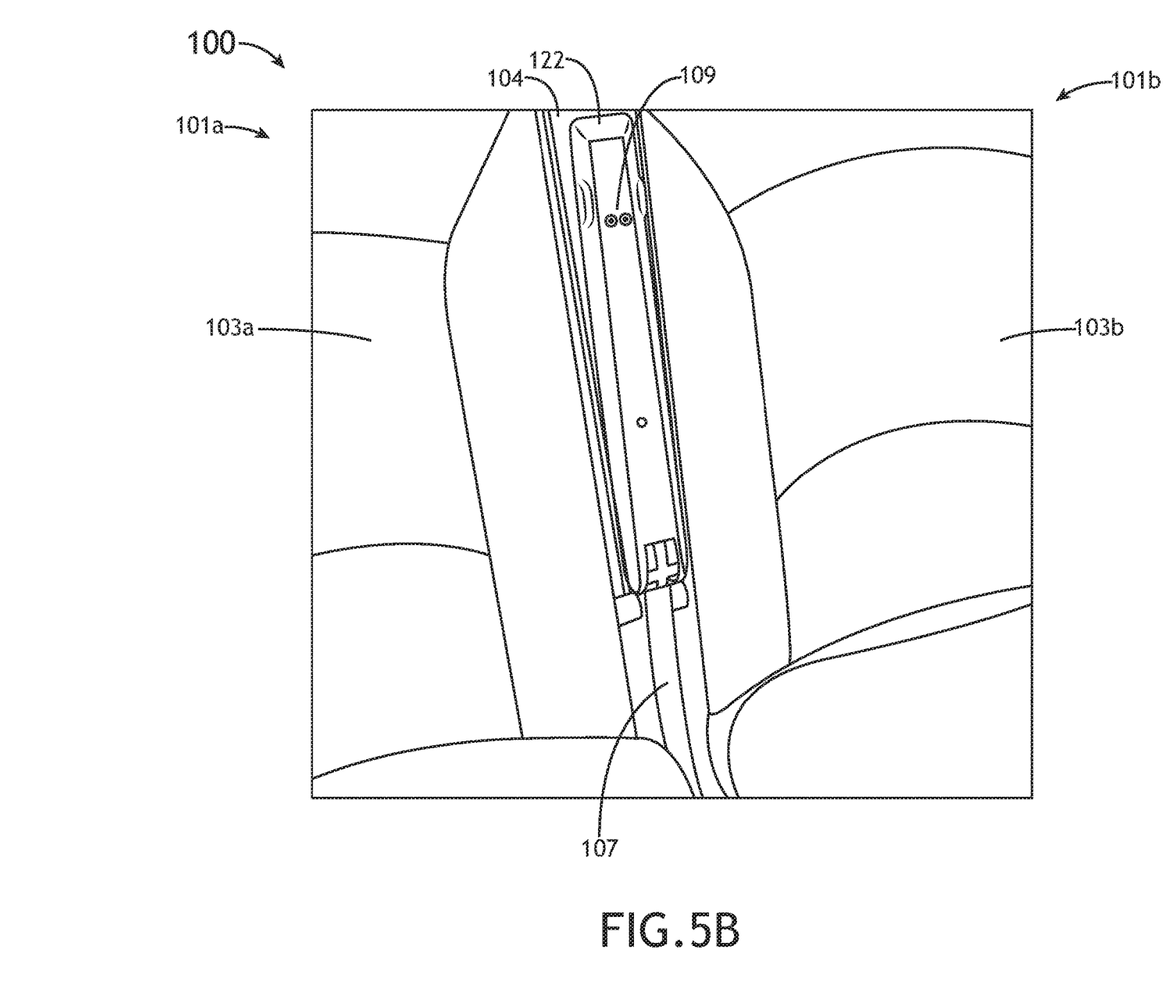
FIG. 5B illustrates a front perspective view of a closeout body of a privacy assembly, in accordance with one or more embodiments of the present disclosure.

In embodiments, the closeout body 104 of the privacy assembly 103 includes a recess 122. The recess 122 may be configured to receive the armrest 109 when the armrest 109 is pivoted/actuated up into a stowed position. For example, as shown in FIG. 5B, the armrest 108 may be selectively pivoted/actuated from an active position to a stowed position, wherein the armrest 109 is disposed within the recess 122 of the closeout body 104 when the armrest 109 is in the stowed position.

The recess 122 may include an inner surface with substantially conforms to a profile of the armrest 109 such that the armrest 109 may be cooperatively disposed within the recess 122. By providing a recess 122 within which the armrest 109 may be disposed, the closeout body 104 may be configured to substantially fill a gap 115 between the seatbacks 103a, 103b of the aircraft passenger seats 101a, 101b, while not interfering with the actuation of the armrest 109 between an active position and a stowed position.

Although example embodiments of the present disclosure are shown and described in an aircraft environment, the inventive concepts of the present disclosure may be configured to operate in alternative and/or additional contexts, unless noted otherwise herein. In this regard, the aircraft passenger seat assembly 100 may instead may be installed and/or configured or dimensioned to fit on any seat of any type of vehicle known in the art that has seats which are positioned in front of one another. For example, the aircraft passenger seat assembly 100 (more generally "seat assembly 100") may be implemented into the seats of any air, land, or water-based personal equipment or vehicle; any air, land, or water-based commercial equipment or vehicle (e.g., busses, trains, subways); any air, land, or water-based military equipment or vehicle known in the art. Additionally, it is noted herein the seat apparatus 100 of the present disclosure may be installed and/or configured or dimensioned to fit on any seat within a home or a business. For example, the seat assembly 100 may be installed and/or configured or dimensioned to fit on a seat in auditoriums, movie theatres, sports venues (e.g., baseball parks, arenas, or other venues having installed seats, or the like), where the seats are arranged in front of one other. Therefore, the above description should not be interpreted as a limitation on the disclosure but merely an illustration.

It is further noted herein that, where the environment includes an aircraft environment, it is noted herein the embodiments of aircraft passenger seat apparatus 100 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger seat assembly, comprising:
an aircraft passenger seat comprising:
a seatback configured to support an upper body of an aircraft passenger;
a seat frame including at least one seat spreader disposed on a lateral side of the seatback;
at least one armrest coupled to the at least one seat spreader; and
at least one privacy assembly comprising:
a closeout body coupled to the at least one seat spreader; and
a privacy panel coupled to the closeout body, the privacy panel extending from the closeout body in order to at least partially separate a seating environment of the aircraft passenger seat from an adjacent seating environment of an adjacent aircraft passenger seat, wherein the at least one armrest is pivotably coupled to the at least one seat spreader.

2. The aircraft passenger seat assembly of claim 1, wherein the closeout body is configured to substantially fill a gap between a lateral surface of the seatback of the aircraft passenger seat and an adjacent lateral surface of the adjacent aircraft passenger seat.

3. The aircraft passenger seat assembly of claim 2, wherein the closeout body includes a first contoured edge conforming to the lateral surface of the aircraft passenger seat, and a second contoured edge conforming to the adjacent lateral surface of the adjacent aircraft passenger seat.

4. The aircraft passenger seat assembly of claim 1, wherein the at least one seat spreader comprises a first seat spreader disposed on a first lateral side of the seatback, and a second seat spreader disposed on a second lateral side of the seatback opposite the first side.

5. The aircraft passenger seat assembly of claim 4, wherein the at least one privacy assembly comprises a first privacy assembly coupled to the first seat spreader, and a second privacy assembly coupled to the second seat spreader.

6. The aircraft passenger seat assembly of claim 1, wherein the at least one privacy assembly further includes:
a recess configured to receive the at least one armrest when the armrest is actuated into a stowed position.

7. The aircraft passenger seat assembly of claim 1, wherein the closeout body is coupled to the at least one seat spreader by one or more mechanical fasteners.

8. The aircraft passenger seat assembly of claim 1, wherein the closeout body and the at least one seat spreader is fabricated as a unitary seat spreader assembly.

9. The aircraft passenger seat assembly of claim 1, wherein the privacy panel is removably coupled to the closeout body.

10. The aircraft passenger seat assembly of claim 1, wherein the closeout body includes a rear closeout body surface proximate to a rear seatback surface of the seatback.

11. The aircraft passenger seat assembly of claim 10, wherein the rear closeout body surface includes one or more storage structures comprising at least one of a hook, a clip, a bracket, or a mobile device stowage assembly.

12. The aircraft passenger seat assembly of claim 10, wherein the rear closeout body surface includes one or more cupholder assemblies disposed on the rear closeout body surface.

13. An aircraft passenger seat assembly, comprising:
an aircraft passenger seat comprising:
a seatback configured to support an upper body of an aircraft passenger;
a seat frame including at least one seat spreader disposed on a lateral side of the seatback;
at least one privacy assembly comprising:
a closeout body coupled to the at least one seat spreader; and
a privacy panel coupled to the closeout body, the privacy panel extending from the closeout body in order to at least partially separate a seating environment of the aircraft passenger seat from an adjacent seating environment of an adjacent aircraft passenger seat, wherein the privacy panel is removably coupled to the closeout body.

14. The aircraft passenger seat assembly of claim 13, wherein the closeout body is configured to substantially fill a gap between a lateral surface of the seatback of the aircraft passenger seat and an adjacent lateral surface of the adjacent aircraft passenger seat.

15. The aircraft passenger seat assembly of claim 14, wherein the closeout body includes a first contoured edge conforming to the lateral surface of the aircraft passenger seat, and a second contoured edge conforming to the adjacent lateral surface of the adjacent aircraft passenger seat.

16. An aircraft passenger seat assembly, comprising:
an aircraft passenger seat comprising:
a seatback configured to support an upper body of an aircraft passenger;
a seat frame including at least one seat spreader disposed on a lateral side of the seatback;
at least one armrest coupled to the at least one seat spreader; and
at least one privacy assembly comprising:
a closeout body coupled to the at least one seat spreader; and
a privacy panel coupled to the closeout body, the privacy panel extending from the closeout body in order to at least partially separate a seating environment of the aircraft passenger seat from an adjacent seating environment of an adjacent aircraft passenger seat; and
a recess configured to receive the at least one armrest when the armrest is actuated into a stowed position.

17. The aircraft passenger seat assembly of claim 16, wherein the closeout body is configured to substantially fill a gap between a lateral surface of the seatback of the aircraft passenger seat and an adjacent lateral surface of the adjacent aircraft passenger seat.

18. The aircraft passenger seat assembly of claim 17, wherein the closeout body includes a first contoured edge conforming to the lateral surface of the aircraft passenger seat, and a second contoured edge conforming to the adjacent lateral surface of the adjacent aircraft passenger seat.

19. An aircraft passenger seat assembly, comprising:
an aircraft passenger seat comprising:
a seatback configured to support an upper body of an aircraft passenger;
a seat frame including at least one seat spreader disposed on a lateral side of the seatback;
at least one privacy assembly comprising:
a closeout body coupled to the at least one seat spreader; and
a privacy panel coupled to the closeout body, the privacy panel extending from the closeout body in order to at least partially separate a seating environment of the aircraft passenger seat from an adjacent seating environment of an adjacent aircraft passenger seat, wherein the closeout body includes a rear closeout body surface proximate to a rear seatback surface of the seatback, the rear closeout body surface includes one or more cupholder assemblies or one or more storage structures.

20. The aircraft passenger seat assembly of claim 19, wherein the closeout body is configured to substantially fill a gap between a lateral surface of the seatback of the aircraft passenger seat and an adjacent lateral surface of the adjacent aircraft passenger seat.

21. The aircraft passenger seat assembly of claim 20, wherein the closeout body includes a first contoured edge conforming to the lateral surface of the aircraft passenger seat, and a second contoured edge conforming to the adjacent lateral surface of the adjacent aircraft passenger seat.

* * * * *